(12) United States Patent
Haubenstricker et al.

(10) Patent No.: US 10,775,261 B2
(45) Date of Patent: Sep. 15, 2020

(54) IN-VEHICLE SEAL INTEGRITY VERIFICATION SYSTEM

(71) Applicant: STEERING SOLUTIONS IP HOLDING CORPORATION, Saginaw, MI (US)

(72) Inventors: Kevin J. Haubenstricker, Frankenmuth, MI (US); Conrad G. Vorwerck, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 360 days.

(21) Appl. No.: 15/894,392

(22) Filed: Feb. 12, 2018

(65) Prior Publication Data

US 2019/0250063 A1    Aug. 15, 2019

(51) Int. Cl.
| | |
|---|---|
| G01M 3/00 | (2006.01) |
| G01M 3/26 | (2006.01) |
| G01M 17/007 | (2006.01) |
| B60R 16/023 | (2006.01) |
| B62D 5/04 | (2006.01) |

(52) U.S. Cl.
CPC .......... G01M 3/26 (2013.01); B60R 16/0231 (2013.01); B62D 5/0406 (2013.01); G01M 17/007 (2013.01)

(58) Field of Classification Search
CPC ...................................................... G01M 3/26
See application file for complete search history.

(56) References Cited

U.S. PATENT DOCUMENTS

| | | | |
|---|---|---|---|
| 4,457,180 A * | 7/1984 | List | G01L 19/0007 137/557 |
| 2004/0207255 A1* | 10/2004 | Meyer | B60T 8/3675 303/119.3 |
| 2017/0102308 A1* | 4/2017 | Gillette, II | F01M 11/10 |
| 2019/0250063 A1* | 8/2019 | Haubenstricker | B60R 16/0231 |
| 2019/0356192 A1* | 11/2019 | Haubenstricker | B62D 5/0403 |

* cited by examiner

*Primary Examiner* — Jamel E Williams
(74) *Attorney, Agent, or Firm* — Dickinson Wright PLLC

(57) ABSTRACT

A seal integrity verification system includes a pressure source, a valve, and a pressure sensor. The pressure source is fluidly connected to a housing having at least one sealing member. The valve is fluidly connected to the pressure source and the housing. The valve is movable between a first open position and a closed position. The pressure sensor is arranged to provide a first signal indicative of a pressure within the housing.

10 Claims, 1 Drawing Sheet

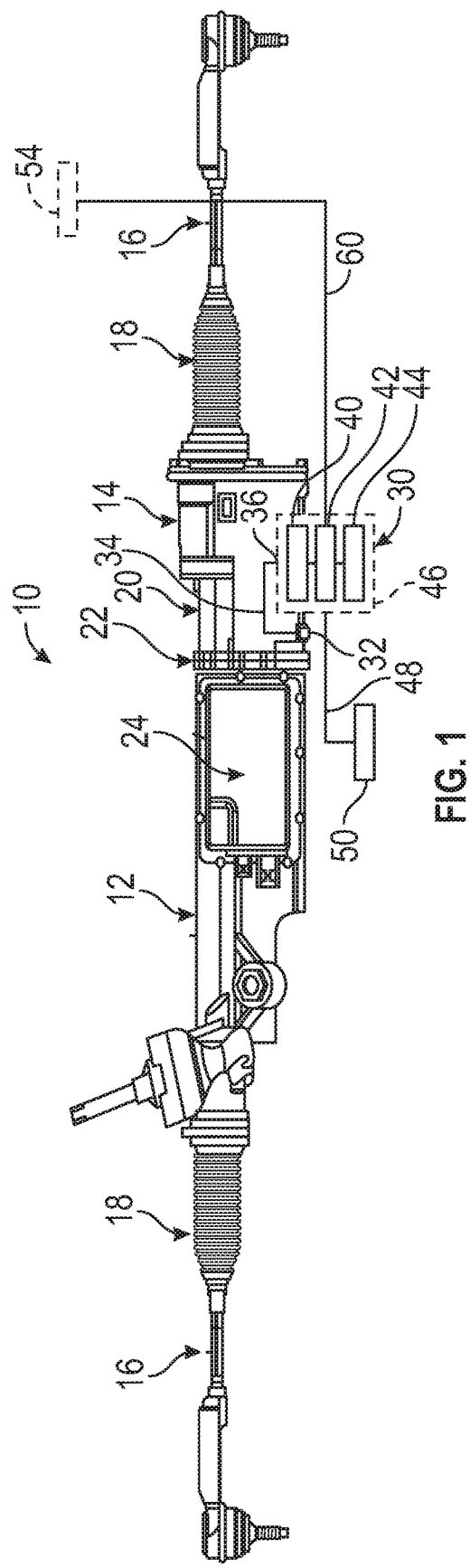
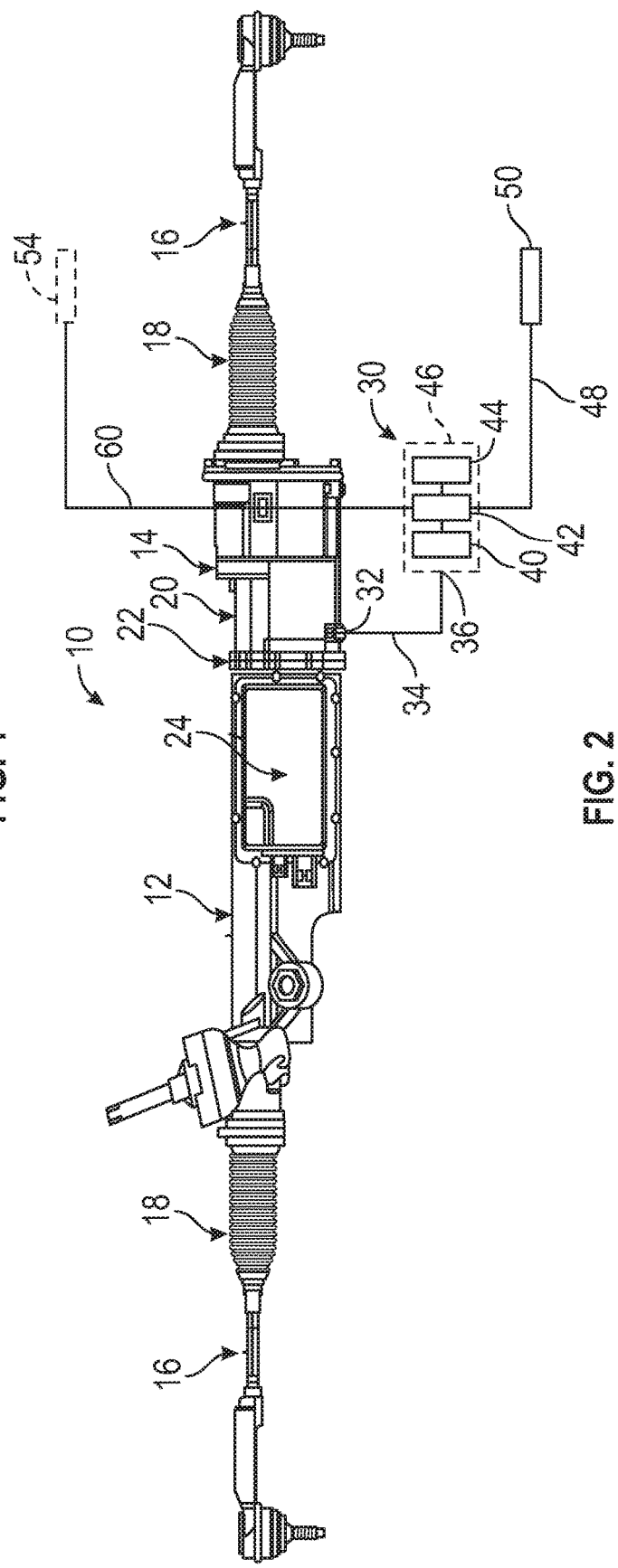

IN-VEHICLE SEAL INTEGRITY VERIFICATION SYSTEM

BACKGROUND

Vehicles may be provided with a power steering system having an electronic assist mechanism. The electronic assist mechanism provides a driving force that is transmitted to a portion of the power steering system to assist or amplify a steering force applied by an operator of the vehicle. The electronic assist mechanism may be disposed close to a road surface or an external environment of the vehicle requiring the electronic assist mechanism to be sealed to inhibit the intrusion of water or foreign objects into the power steering system.

SUMMARY

According to an embodiment of the present disclosure, a seal integrity verification system is provided. The seal integrity verification system includes a pressure source, a valve, and a pressure sensor. The pressure source is fluidly connected to a housing having at least one sealing member. The valve is fluidly connected to the pressure source and the housing. The valve is movable between a first open position and a closed position. The pressure sensor is arranged to provide a first signal indicative of a pressure within the housing.

According to another embodiment of the present disclosure, an electric power steering system is provided. The electric power steering system includes an electric power steering unit and a seal integrity verification system. The electric power steering unit has a housing that is provided with at least one sealing member. The seal integrity verification system includes a pressure sensor, a pressure source, and a control unit. The pressure sensor is disposed within the housing and is arranged to monitor a pressure within the housing. The pressure source is disposed on the housing and is fluidly connected to the housing. The control unit is in communication with the pressure source and the pressure sensor.

According to yet another embodiment of the present disclosure, an electric power steering system is provided. The electric power steering system includes an electric power steering unit and a seal integrity verification system. The electric power steering unit has a housing that is provided with at least one sealing member. The seal integrity verification system includes a pressure sensor and a pressure source. The pressure sensor is arranged to monitor a pressure within the housing. The pressure source is fluidly connected to the housing through a valve that is fluidly connected to the pressure source and the housing. The valve is movable between an open position and a closed position.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 1 is an elevation view of an electric power steering system having a seal integrity verification system according to a first embodiment; and FIG. 2 is an elevation view of an electric power steering system having a seal integrity verification system according to a second embodiment.

DETAILED DESCRIPTION

Referring now to the Figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Referring to FIGS. 1 and 2, an electric power steering system 10 is shown. The electric power steering system 10 may include a steering mechanism that is disposed within a rack housing 12 and a power assist mechanism 14. The steering mechanism may be protected from an external environment by flexible boots 18 that are disposed at ends of the rack housing 12. The steering mechanism may include a toothed rack that laterally translates responsive to rotation of a gear to move at least one tie rod 16 to move or pivot at least one vehicle wheel.

The power assist mechanism 14 may be an electric power steering unit having a housing 20 provided with at least one sealing member 22, such as a gasket, o-ring, or other type of sealing member. The housing 20 having at least one sealing member 22 is sealingly connected to the rack housing 12. In at least one embodiment, at least one sealing member 22 may be a sealed or flanged joint/junction between the rack housing 12 and the housing 20.

The electric power steering unit or power assist mechanism may include a power assist actuator and a control unit 24 that are at least partially disposed within the rack housing 12 having the flexible boots 18 and/or the housing 20 having at least one sealing member 22. In the embodiments shown, the power assist actuator is disposed within the housing 20 and the control unit 24 is disposed within the rack housing 12 proximate the housing 20. The control unit 24 may be in communication with power assist mechanism 14 and may operate the power assist mechanism 14.

The flexible boot 18 and at least one sealing member 22 are provided to at least partially inhibit the intrusion of water or other foreign objects from entering into at least one of the rack housing 12 and/or the housing 20.

At least one of the rack housing 12 having the flexible boots 18 and/or the housing 20 having at least one sealing member 22 may be leak tested to ensure or verify the integrity of the flexible boots 18 and/or at least one sealing member 22 by an onboard or in-vehicle seal integrity verification system 30. The seal integrity verification system 30 may be arranged to ensure or verify the integrity of the flexible boots 18 and/or at least one sealing member 22 while the vehicle that incorporates electric power steering system 10 is on and operational.

In the embodiment shown in FIG. 1, the seal integrity verification system 30 is disposed on the housing 20. In other embodiments, the seal integrity verification system 30 may be disposed on at least one of the rack housing 12 and/or the housing 20.

In the embodiment shown in FIG. 2, the seal integrity verification system 30 is spaced apart from the rack housing 12 and the housing 20.

The seal integrity verification system 30 is fluidly connected to at least one of the rack housing 12 or the housing 20 by a port 32 that is defined by the rack housing 12 or the housing 20 and a first conduit 34 that extends between the port 32 and a port 36 of the seal integrity verification system 30.

For ease of description, the seal integrity verification system 30 will be described as being in communication with the control unit 24 although the seal integrity verification system 30 may be in communication with a separate control unit that is in communication with the seal integrity verification system 30.

The seal integrity verification system 30 includes a pressure sensor 40, a valve 42, and a pressure source 44. The seal integrity verification system 30 may be at least partially disposed within at least one of the rack housing 12 and/or the housing 20, as shown in FIG. 1. The seal integrity verification system 30 may be provided as an integral unit having the pressure sensor 40, the valve 42, and the pressure source 44 all integrated into a unit housing 46, as shown in FIG. 2.

The pressure sensor 40 is in communication with the control unit 24 and is arranged to monitor a pressure and/or a change in pressure (pressure decay) within at least one of the rack housing 12 and/or the housing 20. The pressure sensor 40 is arranged to provide a first signal indicative of a pressure within at least one of the rack housing 12 and/or the housing 20. The pressure sensor 40 is further arranged to provide a second signal indicative of a pressure decay within at least one of the rack housing 12 and/or the housing 20.

The pressure sensor 40 may be disposed within the housing 20, as shown in FIG. 1. The pressure sensor 40 may be spaced apart from the housing 20 and disposed within the unit housing 46, as shown in FIG. 2. The pressure sensor 40 may be a pressure transducer or other pressure measurement device.

The valve 42 is in communication with the control unit 24. The valve 42 is fluidly connected to the pressure source 44 and an interior of the housing 20. The valve 42 may be at least partially disposed on or extend through the housing 20, as shown in FIG. 1. The valve 42 may be spaced apart from and fluidly connected to the housing 20, as shown in FIG. 2.

The valve 42 may be an electronically actuated two-way valve or three-way valve. Should the valve 42 be configured as a two way valve, the valve 42 is movable between a first open position and a closed position. The first open position may be a position of the valve 42 that enables a fluid from the pressure source 44 to enter and/or exit the rack housing 12 and/or the housing 20. The closed position may be a position that inhibits a fluid from the pressure source 44 from entering and/or exiting the rack housing 12 and/or the housing 20.

Should the valve 42 be configured as a three-way valve, the valve 42 is movable between the first open position, a second open position, and the closed position. The first open position may be a position of the valve 42 that enables the fluid from the pressure source 44 to enter and/or exit the rack housing 12 and/or the housing 20. The second open position may be a position of the valve 42 that enables a fluid from the pressure source 44 to exit the rack housing 12 and/or the housing 20 and be vented through a vent line 48 through a vent 50. The vent 50 may vent into the passenger compartment of the vehicle or directly to the external environment. The closed position may be a position that inhibits a fluid from the pressure source 44 from entering and/or exiting the rack housing 12 and/or the housing 20.

The pressure source 44 is in communication with the control unit 24. The pressure source 44 is fluidly connected to at least one of the rack housing 12 and/or the housing 20 through the valve 42. The pressure source 44 may be disposed on or disposed proximate the rack housing 12 and/or the housing 20, as shown in FIG. 1. The pressure source 44 may be spaced apart from the rack housing 12 and/or the housing 20 and disposed within the unit housing 46, as shown in FIG. 2.

The pressure source 44 may be a compressor that is arranged to provide a fluid to the rack housing 12 and/or the housing 20 at a positive pressure. The compressor may be arranged to receive air or a fluid from a generally ambient source such as an interior of the vehicle, the engine air cleaner compartment, or another ambient air source.

The pressure source 44 may alternatively be a vacuum source 54 that is arranged to produce or provide a negative pressure within the rack housing 12 and/or the housing 20. The vacuum source 54 may be a vacuum pump, a vacuum manifold, or other vacuum source that may be provided with the vehicle. A second conduit 60 extends between the vacuum source 54 and the seal integrity verification system 30.

In at least one embodiment, a pressure regulator may be provided to limit the pressure provided by the pressure source 44.

The control unit 24 may be provided with input communication channels that are arranged to receive the first signal and the second signal from the pressure sensor 40, a signal indicative of the position of the valve 42, and a signal indicative of the operational state of the pressure source 44. The control unit 24 may be provided with output communication channels that are arranged to provide signals or commands to the valve 42 to change or vary a position of the valve 42 and to provide signals or commands to the pressure source 44 to change the operational state of the pressure source 44.

The control unit 24 may be provided with at least one processor that is programmed to run or perform a seal verification routine to ensure or verify the integrity of at least one of the flexible boots 18 and/or at least one sealing member 22. Responsive to a request to verify or ensure the integrity of at least one of the flexible boots 18 and/or at least one sealing member 22, the control unit 24 may command the valve 42 to move from the closed position towards the first open position and may command the pressure source 44 to operate. Operation of the pressure source 44 may result in the compressor operating to provide a fluid into at least one of the rack housing 12 and/or the housing 20 at a positive pressure. Operation of the pressure source 44 may result in the vacuum source 54 drawing a vacuum or reducing a pressure within at least one of the rack housing 12 and/or the housing 20.

Responsive to at least one of a predetermined time period and/or the first signal being indicative of an internal pressure within at least one of the rack housing 12 and/or the housing 20 achieving or being proximate a predetermined fluid pressure, the control unit 24 may command the pressure source 44 to cease operation and may command the valve 42 to move towards the closed position.

Responsive to the second signal being indicative of a change in pressure or pressure decay within at least one of the rack housing 12 and/or the housing 20 being greater than a threshold, the control unit 24 may output a warning indicative of a possibly compromised flexible boot 18 and/or at least one sealing member 22.

Responsive to the completion of the seal verification routine, the control unit 24 may command the valve 42 to vent the fluid from within at least one of the rack housing 12 and/or the housing 20. The control unit 24 may command the valve 42 to move towards the first open position, should the valve 42 be a two-way valve, or may command the valve 42 to move towards the second open position should the valve 42 be a three-way valve.

The seal integrity verification system 30 enables an in-vehicle leak test to ensure or verify seal integrity of various sealing members that are associated with the rack housing 12 and/or the housing 20 prior to the intrusion of water or other foreign objects. The seal integrity verification system 30 may perform the seal verification routine at various preset intervals or may be manually actuated. The seal integrity verification system 30 utilizes the pressure source 44 to change the pressure to a given value within the rack housing 12 or the housing 20. The seal integrity verification system 30 then utilize the valve 42 to seal the rack housing 12 and/or the housing 20 from the pressure source 44 and monitor the pressure decay versus time via the pressure sensor 40 to determine a possible leak rate based on the pressure decay. The seal integrity verification system 30 determines whether the sealing features pass or fail the seal integrity check based on the possible leak rate. The seal integrity verification system 30 releases the pressure within the rack housing 12 and/or the housing 20 at least until an ambient pressure is achieved and seals at least one of the rack housing 12 and/or the housing 20 via the valve 42.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the present disclosure, it is claimed:

1. An electric power steering system, comprising:
    an electric power steering unit having a housing provided with at least one sealing member; and
    a seal integrity verification system, comprising:
        a pressure sensor disposed within the housing and arranged to monitor a pressure within the housing,
        a pressure source disposed on the housing and fluidly connected to the housing, and
        a control unit in communication with the pressure source and the pressure sensor.

2. The electric power steering system of claim 1, wherein the seal integrity verification system further comprising:
    a valve operatively connected to the housing, fluidly connected to the pressure source and housing, and in communication with the control unit.

3. The electric power steering system of claim 2, wherein the valve is movable between a closed position to inhibit a fluid from the pressure source to at least one of enter and exit the housing and an open position to enable the fluid to at least one of enter and exit the housing.

4. The electric power steering system of claim 3, wherein the control unit is programmed to command the valve to move towards the open position and command the pressure source to operate to provide the fluid to enter the housing at least until a predetermined fluid pressure is achieved within the housing.

5. The electric power steering system of claim 4, wherein the control unit is programmed to command the valve to move towards the closed position in response to the predetermined fluid pressure being achieved within the housing.

6. The electric power steering system of claim 5, wherein the pressure source is further arranged to monitor a pressure decay within the housing.

7. The electric power steering system of claim 6, wherein the control unit is programmed to command the valve to move towards the open position.

8. An electric power steering system, comprising:
    an electric power steering unit having a housing provided with at least one sealing member; and
    a seal integrity verification system spaced apart from the housing, comprising:
        a pressure sensor that is arranged to monitor a pressure within the housing, and
        a pressure source fluidly connected to the housing through a valve that is fluidly connected to the pressure source and the housing, the valve movable between an open position and a closed position.

9. The electric power steering system of claim 8, further comprising:
    a control unit in communication with the pressure source, the pressure sensor, and the valve.

10. The electric power steering system of claim 8, further comprising:
    a first conduit extending between a port defined by the housing and the seal integrity verification system.

* * * * *